United States Patent
Bailey et al.

(10) Patent No.: US 9,157,635 B2
(45) Date of Patent: Oct. 13, 2015

(54) FUEL DISTRIBUTION MANIFOLD

(75) Inventors: Donald Mark Bailey, Simpsonville, SC (US); Gregory Allen Boardman, Greer, SC (US); William Thomas Ross, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 115 days.

(21) Appl. No.: 13/342,497

(22) Filed: Jan. 3, 2012

(65) Prior Publication Data

US 2013/0167954 A1 Jul. 4, 2013

(51) Int. Cl.
*B01F 5/00* (2006.01)
*F23K 5/06* (2006.01)
*F02C 7/22* (2006.01)

(52) U.S. Cl.
CPC .. *F23K 5/06* (2013.01); *F02C 7/222* (2013.01)

(58) Field of Classification Search
CPC ....... F15C 1/16; F01D 1/22; F05D 2250/322; F25B 39/028; F25B 41/06; F28F 9/0282
USPC ..................... 137/561 A, 808; 60/39.34, 739; 285/125.1
See application file for complete search history.

(56) References Cited

U.S. PATENT DOCUMENTS

| | | | |
|---|---|---|---|
| 3,417,564 A * | 12/1968 | Call | 60/39.34 |
| 3,632,286 A | 1/1972 | Kegan et al. | |
| 3,982,879 A | 9/1976 | Pfefferle | |
| 4,052,002 A | 10/1977 | Stouffer et al. | |
| 4,112,977 A * | 9/1978 | Syred et al. | 137/812 |
| 4,120,158 A | 10/1978 | Sheinbaum | |
| 4,670,062 A | 6/1987 | Lester | |
| 4,920,740 A * | 5/1990 | Shekleton | 60/790 |
| 5,059,226 A * | 10/1991 | Schneider et al. | 55/459.1 |
| 5,356,600 A | 10/1994 | Kiyonaga et al. | |
| 5,402,659 A | 4/1995 | Turner et al. | |
| 5,429,307 A | 7/1995 | Darroch | |
| 5,698,012 A | 12/1997 | Yoshikawa | |
| 5,791,137 A | 8/1998 | Evans et al. | |
| 6,755,024 B1 * | 6/2004 | Mao et al. | 60/776 |
| 7,041,089 B2 | 5/2006 | Laughlin | |
| 7,404,286 B2 * | 7/2008 | Lior | 60/39.35 |
| 7,571,735 B2 | 8/2009 | Wagner | |
| 7,654,092 B2 | 2/2010 | Ryan et al. | |

(Continued)

FOREIGN PATENT DOCUMENTS

| | | |
|---|---|---|
| WO | 2004053326 A1 | 6/2004 |
| WO | 2006017737 A2 | 2/2006 |

(Continued)

*Primary Examiner* — Craig Schneider
*Assistant Examiner* — Angelisa Hicks

(57) ABSTRACT

A fuel distribution manifold comprises an outer shell having an inner surface. The outer shell defines an inlet for receiving fuel from a parent supply line, a base opposite the inlet, a central manifold axis that intersects the inlet, and a plurality of outlets for delivering fuel to offspring fuel lines, each outlet defining a respective outlet axis. In one exemplary embodiment, a fuel distribution manifold also comprises a center-body having an outer surface and being positioned within the outer shell wherein the outer surface of the center-body and the inner surface of the outer shell define a flow-path through which fluid flows from the inlet to the plurality of outlets. In another exemplary embodiment, at least one of the outlets is positioned adjacent to the base and oriented so that its respective outlet axis is rotated relatively to a radial direction that intersects the central manifold axis.

19 Claims, 2 Drawing Sheets

(56) References Cited

U.S. PATENT DOCUMENTS

| | | |
|---|---|---|
| 7,677,308 B2 | 3/2010 | Kolle |
| 7,716,933 B2 | 5/2010 | Prociw et al. |
| 7,726,112 B2 | 6/2010 | Dooley |
| 7,842,264 B2 | 11/2010 | Cooper et al. |
| 7,854,120 B2 | 12/2010 | Olver |
| 7,992,390 B2 | 8/2011 | Patel et al. |
| 8,037,690 B2 | 10/2011 | Morenko et al. |
| 8,196,395 B2 | 6/2012 | Fong et al. |
| 2005/0140031 A1 | 6/2005 | Gerking |
| 2007/0062374 A1 | 3/2007 | Kolle |
| 2008/0066720 A1 | 3/2008 | Piper et al. |
| 2008/0250715 A1 | 10/2008 | Cooper et al. |
| 2009/0107147 A1 | 4/2009 | Piper et al. |
| 2009/0288390 A1 | 11/2009 | Pavia et al. |
| 2010/0080077 A1 | 4/2010 | Coy |
| 2010/0163232 A1 | 7/2010 | Kolle |
| 2010/0240780 A1 | 9/2010 | Holcombe |
| 2010/0289270 A1 | 11/2010 | Behrens et al. |
| 2010/0293980 A1 * | 11/2010 | Shimaoka et al. ........... 62/259.1 |
| 2010/0326075 A1 | 12/2010 | Fong et al. |
| 2010/0329903 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |

FOREIGN PATENT DOCUMENTS

| | | |
|---|---|---|
| WO | 2006032141 A1 | 3/2006 |
| WO | 2008033542 A2 | 3/2008 |
| WO | 2008127557 A1 | 10/2008 |
| WO | 2009055045 A1 | 4/2009 |
| WO | 2010039433 A1 | 4/2010 |
| WO | 2010132602 A1 | 11/2010 |
| WO | 2010147496 A1 | 12/2010 |

* cited by examiner

FUEL DISTRIBUTION MANIFOLD

BACKGROUND OF THE INVENTION

The subject matter disclosed herein relates generally to fuel distribution manifolds and more particularly to a fuel distribution manifold having a center-body for dividing an inlet stream of fuel for distribution to a plurality of outlets.

An internal combustion engine, such as a gas turbine engine, requires a system for delivering fuel to be combusted within the engine. In one such system, a parent supply line carries a parent stream of fuel from a fuel reservoir to a fuel distribution manifold. The fuel distribution manifold provides fuel to a plurality of offspring fuel lines, each delivering a respective offspring stream of fuel to a respective fuel injector. The injectors are positioned and configured for delivering fuel to desired positions in the engine with a desired set of properties or attributes (e.g., at a desired pressure, temperature, and mass flow rate, at desired times, etc.).

One purpose of a fuel distribution manifold is to receive the parent stream of fuel from the parent supply line and to deliver fuel to each of the offspring fuel lines at a pressure, temperature, and rate of flow that will enable delivery of the fuel to fuel injectors with the appropriate attributes. It is often desirable for the attributes of the fuel entering each of the offspring fuel lines to be approximately equal (e.g., at a uniform or approximately uniform pressure, temperature, etc.).

Experience has shown that as fuel flows through a fuel distribution manifold, heat may be transferred to the fuel, and the extent to which the fuel takes up heat depends upon the local velocity of the fuel. For example, in a location within a fuel distribution manifold where a stream of fuel slows or becomes stagnant or re-circulates rather than continuing to flow through the fuel distribution manifold (i.e., at a secondary recirculation zone), that stream of slowing, stagnating, or re-circulating fuel may effectively reside in a location for receiving heat for a longer period of time, and may therefore receive more heat than if it were to take less time to flow through the fuel distribution manifold (i.e., to flow at a faster rate).

In some situations, the quantity of heat transferred to the fuel may be sufficient to cause carbon deposits to accumulate (i.e., coking) on surfaces of the fuel distribution manifold. Unfortunately, such carbon deposits can occasionally break free and be carried with the fuel so as to lodge in locations where they disrupt the flow of fuel or interfere with the operation of the fuel delivery system. Therefore, it may be desirable to design a fuel distribution manifold in which velocity of the flowing fuel is sufficiently great to avoid coking. Unfortunately, increased flow velocities are known to cause losses in the pressure of the flowing fuel as a result of irreversible dynamic processes such as friction.

Accordingly, those skilled in the art seek a fuel distribution manifold that can deliver fuel to a set of desired locations in accordance with a desired set of attributes while reducing, or better tolerating, coking.

BRIEF DESCRIPTION OF THE INVENTION

According to one aspect of the invention, a fuel distribution manifold comprises an outer shell having an inner surface and being configured for containing a flow of pressurized fuel. The outer shell defines an inlet for receiving a supply of fuel from a parent supply line, a plurality of outlets for delivering fuel to offspring fuel lines, and a central manifold axis that intersects the inlet. The fuel distribution manifold further comprises a center-body having an outer surface and being positioned within the outer shell. The outer surface of the center-body and the inner surface of the outer shell define a flow-path through which fluid flows from the inlet to the plurality of outlets.

According to another aspect of the invention, a fuel distribution manifold comprises an outer shell having an inner surface that defines a flow-path through which fluid flows from the inlet to a plurality of outlets. The outer shell also defines an inlet for receiving a supply of fuel from a parent supply line, a base opposite the inlet, and a central manifold axis that intersects the inlet. The outer shell also defines a plurality of outlets for delivering fuel to offspring fuel lines, each outlet defining a respective outlet axis. The outer shell is configured for containing a flow of pressurized fuel. At least one of the outlets is positioned adjacent to the base and oriented so that its respective outlet axis is rotated relatively to a radial direction that intersects the central manifold axis.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
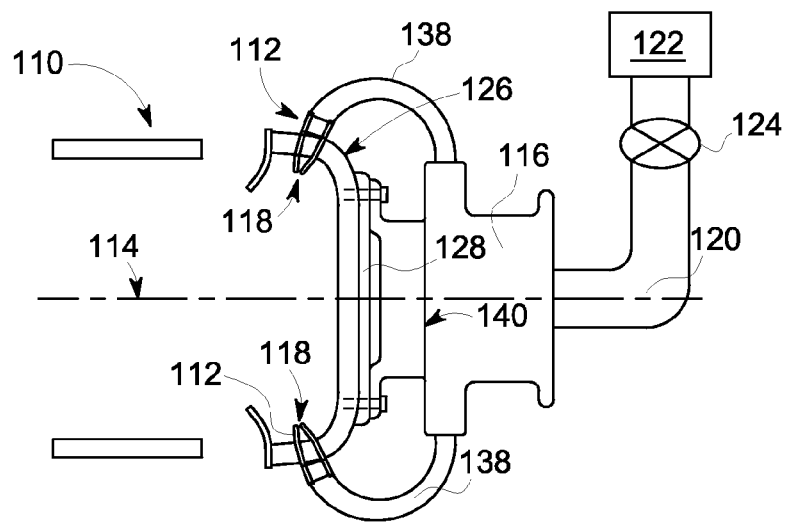
FIG. 1 is a cutaway drawing showing an exemplary can combustor with an end cover manifold.

As shown in FIG. 1, a combustor 110 for an engine (not shown) includes one or more fuel injectors 112. Combustor 110 is configured so as to receive flows of fuel and oxidizer and to facilitate combustion. In the illustrated example, combustor 110 is configured as a shell or can that is shaped symmetrically about a combustor axis 114. As illustrated, combustor 110 may include a dedicated fuel distribution manifold 116. Alternatively, a single fuel distribution manifold 116 may serve to deliver fuel to more than one combustor. An engine (not shown) may comprise one of more combustors. One exemplary engine comprises sixteen combustors.

It may be desirable to control the rate of flow of fuel that may be controlled so as to meet power or operability constraints associated with the combustor 110 or the engine (not shown). A rate of flow of fuel through an injection device, such as a fuel injector 112, may be controlled in a number of ways such as by: (1) varying the area of an orifice 118 associated with the device; (2) changing a pressure at which fuel is supplied to the orifice 118; or (3) varying the time interval during which fuel is allowed to flow through the orifice 118. Fuel may comprise a liquid, such as a petroleum distillate, or an emulsion such as water and oil. It may be desirable to occasionally purge a fuel distribution system and/or components of a fuel distribution system with water or another solvent and/or with compressed gas, such as natural gas.

A pressure of fuel in the parent supply line 120 is affected by operation of a fuel supply pump 122. A control valve 124 is positioned downstream from the fuel supply pump 122 and is configured to be manipulated so as to adjust its flow area, thereby regulating the mass flow rate of fuel provided to each parent supply line 120. In an engine having more than one fuel distribution manifold 116, a ring manifold (not shown) is positioned so as to receive fuel from the fuel supply pump 122 and to provide the fuel to each parent supply line 120.

Figure 2:
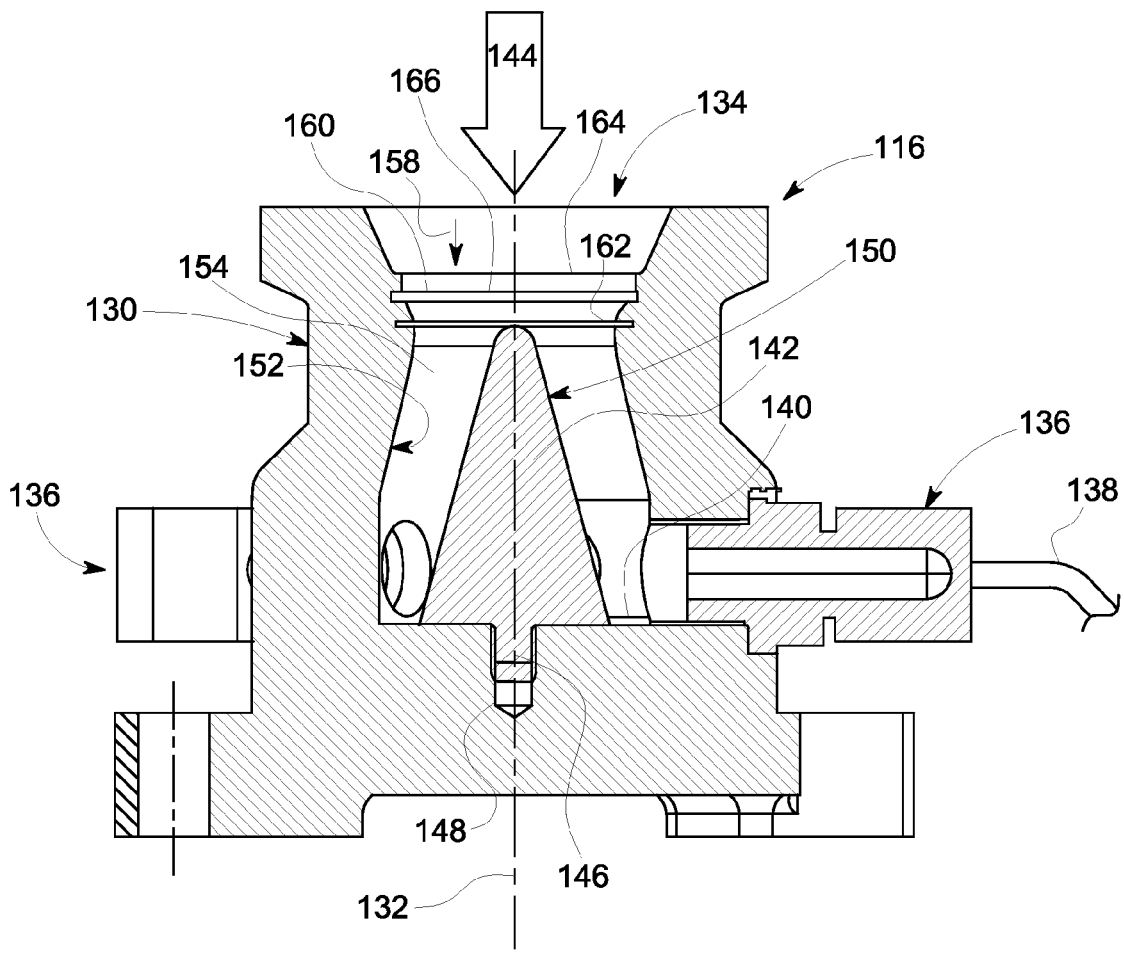
FIG. 2 is a cutaway drawing showing an exemplary fuel distribution manifold.

In an exemplary embodiment of the invention, as shown in FIG. 2, a fuel distribution manifold 116 comprises an outer shell 130 that defines a central manifold axis 132. The outer shell 130 also defines an inlet 134 for receiving a supply of fuel from the parent supply line 120 and two or more outlets 136 for delivering fuel to offspring fuel lines 138. Opposite the inlet 134, the outer shell 130 defines a base 140.

In an exemplary embodiment, a fuel distribution manifold 116 is configured to be mounted on an end cover 126 of a can combustor 110 and is thus known as an end cover manifold. Fuel flowing through a fuel distribution manifold 116, particularly a fuel distribution manifold mounted to an end cover 126 of a combustor 110, receives heat from the end cover 126 as transferred through the fuel distribution manifold 116, e.g., through the base 140. Thus, where addition of heat to the fuel is desirable, a fuel distribution manifold 116 may be configured so as to transmit heat from an adjacent structure such as a combustor end cover 126. This may be accomplished by constructing the fuel distribution manifold 116 (e.g., the base 140) from a heat conducting material and maintaining heat transfer paths (e.g., direct contact) to the combustor end cover 126. Where addition of heat to the fuel is sought to be reduced or avoided, a fuel distribution manifold 116 may be configured so as to resist transfer of heat from an adjacent structure such as a combustor end cover 126. This may be accomplished by positioning a heat insulating material between the fuel distribution manifold 116 and the combustor end cover 126 or by constructing appropriate portions of the fuel distribution manifold 116, such as the base 140, from one or more materials that inhibit or resist transmission of heat. Whether, and to what extent, it is desirable to facilitate transfer of heat to the fuel or to resist transfer of heat to the fuel depends upon the particular implementation.

The outer shell 130 is also configured for containing pressurized fuel. In an exemplary embodiment, the outer shell 130 is configured to control the transfer of heat from adjacent structure, such as a combustor end cover 126, to fuel flowing through the fuel distribution manifold 116. Depending upon the specific needs of the particular engine in which the fuel distribution manifold 116 is to be implemented, the outer shell 130 may comprise material suitable for conducting heat to the fuel and/or may comprise material suitable for resisting transmission of heat to the fuel. Still further, the fuel distribution manifold 116 may comprise a combination of materials arranged so as to facilitate transfer heat where such transfer is desirable (e.g., where cooling of adjacent structures or heating of the fuel is desired) and to resist transfer of heat in locations where transferring heat is not desired (e.g., where fuel is susceptible to stagnation, re-circulation, and/or coking). Thus, the outer shell 130 may comprise an insulated portion 128 that is positioned so as to impede the transfer of heat from an adjacent structure such as a combustor end cover 126.

In an exemplary embodiment, a fuel distribution manifold 116 also comprises a center-body 142 positioned (e.g., fixed) within the outer shell 130 so as to divide the stream of fuel 144 entering the fuel distribution manifold 116 through the inlet 134. The center-body 142 is aligned with the central manifold axis 132. In an exemplary embodiment, the center-body 142 is fixed to the base 140 of the outer shell 130, having a trunk 146 that extends into a recess 148 defined by the base 140. An outer surface 150 of the center-body 142 and an inner surface 152 of the outer shell 130 define a flow-path 154 through which the fuel flows as the fuel distribution manifold 116 carries fuel from the inlet 134 and to the plurality of offspring fuel lines 138. In an exemplary embodiment, the outer surface 150 of the center-body 142 is conical in shape. In an exemplary embodiment, the outer surface 150 of the center-body 142 is symmetric about the central manifold axis 132.

As shown in FIG. 2, the outer surface 150 of the center-body 142 and the inner surface 152 of the outer shell 130 are configured so as to cooperate with one another in defining a flow-path 154 wherein the cross-sectional area continuously decreases with increasing distance along the flow-path 154, causing fuel to increase in velocity as it flows through the fuel distribution manifold 116. It should be appreciated that, where a center-body 142 is positioned along the central manifold axis 132, a cross-sectional area of the flow-path 154 at a particular location along the flow-path 154 is defined by the intersection of a plane that is oriented substantially perpendicular to the central manifold axis 132 and both the outer surface 150 of the center-body 142 and the inner surface 152 of the outer shell 130. Where no center-body 142 is positioned along the central manifold axis 132, a cross-sectional area of the flow-path 154 at a particular location along the flow-path 154 is defined by the intersection of a plane that is oriented substantially perpendicular to the central manifold axis 132 and the inner surface 152 of the outer shell 130.

In an exemplary embodiment, both the outer surface 150 of the center-body 142 and the inner surface 152 of the outer shell 130 are shaped so as to cooperate with one another in defining a flow-path 154 wherein the cross-sectional area decreases at least linearly with distance along the central manifold axis 132 in the direction of fuel flow 158. According to this embodiment, as fuel flows from the inlet 134 to the outlet 136, the fuel must pass through a flow-path 154 whose cross-sectional area continuously decreases at a substantially constant rate until the fuel reaches the outlet 136. Thus, in accordance with this exemplary embodiment, the fuel accelerates at a relatively constant rate as it travels through the fuel distribution manifold 116.

In another exemplary embodiment, as fuel flows from the inlet 134 to the outlet 136, the fuel passes through a flow-path 154 whose cross-sectional area decreases at rates that increase with distance along the central manifold axis 132 in the direction of fuel flow 158. According to this embodiment, as fuel flows from the inlet 134 to the outlet 136 it must pass through a flow-path 154 whose cross-sectional area is continuously decreasing at an ever-increasing rate until the fuel reaches the outlet 136. Thus, according to this exemplary embodiment, the fuel accelerates at an ever-increasing rate as it travels through the fuel distribution manifold 116.

Thus, in cooperation with the inner surface 152 of the outer shell 130, the conical shape of the outer surface 150 of the center-body 142 provides a fluid-dynamic feature for accelerating the fuel and thereby reducing the likelihood of a fuel recirculation structure or a fuel stagnation zone within the flow-path 154 of the fuel distribution manifold 116.

In an exemplary embodiment, the outer surface 150 of the center-body 142 is shaped so as to generally produce a desired distribution of fuel velocities throughout the fuel distribution manifold 116 while also avoiding excessive levels of fuel pressure loss. For example, an acceptable range of loss in fuel pressure between the inlet 134 of the fuel distribution manifold 116 and the outlets 136 is between approximately 0.5 percent and approximately 10 percent of the fuel pressure at the inlet 134, with a more desirable pressure loss being in the a range between 3 percent and 5 percent. In one embodiment, the desired fuel velocities are uniform throughout the fuel distribution manifold 116. In another embodiment, the desired fuel velocities increase in a substantially linear manner (i.e., the fuel accelerates at a substantially constant rate) as the fuel flows from the inlet 134 to the outlets 136. In another embodiment, the desired fuel the fuel accelerates at a rate that increases with the distance of travel along the flow-path from inlet 134 to the outlets 136.

In an exemplary embodiment, a suitable balance between a first objective of managing loss of fuel pressure within the fuel distribution manifold 116 and a second objective of producing a desired distribution of fuel velocities throughout the fuel distribution manifold 116 is achieved wherein a cross-sectional area of the flow-path at the inlet 134 is approximately 4 times greater than the cross-sectional area of the flow-path at the base 140 or the outlets 136. In another exemplary embodiment, a desirable balance is achieved with a cross-sectional area of the flow-path at the inlet 134 being approximately 6 times greater than the cross-sectional area of the flow-path at the base 140 or the outlets 136. In still another exemplary embodiment, a desirable balance is achieved with a cross-sectional area of the flow-path at the inlet 134 that is approximately 8 times greater than the cross-sectional area of the flow-path at the base 140 or the outlets 136.

In an exemplary embodiment, the outer surface 150 of the center-body 142 and/or the inner surface 152 of the outer shell 130 may be contoured so as to produce a desirable boundary layer in the flow-path 154 along the outer surface 150 and/or the inner surface 152. In addition, to aid in cleansing and/or for other reasons, the outer surface 150 of the center-body 142 and/or the inner surface 152 of the outer shell 130 may include a coating 160 comprising a material that repels fuel (i.e., exhibiting fuel-phobic properties) so as to reduce surface tension between the fuel and those portions of the outer surface 150 and the inner surface 152 that are wetted by the fuel.

In an exemplary embodiment, the center-body 142 extends from the base 140 to the inlet 134 where the center-body 142 is contoured so as to provide support for an inlet screen 162 that extends across the plane of the inlet 134 and removes foreign objects from the stream of fuel 144 entering the fuel distribution manifold 116. The inlet screen 162 is retained by a snap ring 164, which is contoured to match the shape of a screen retainer plate 166.

Figure 3:
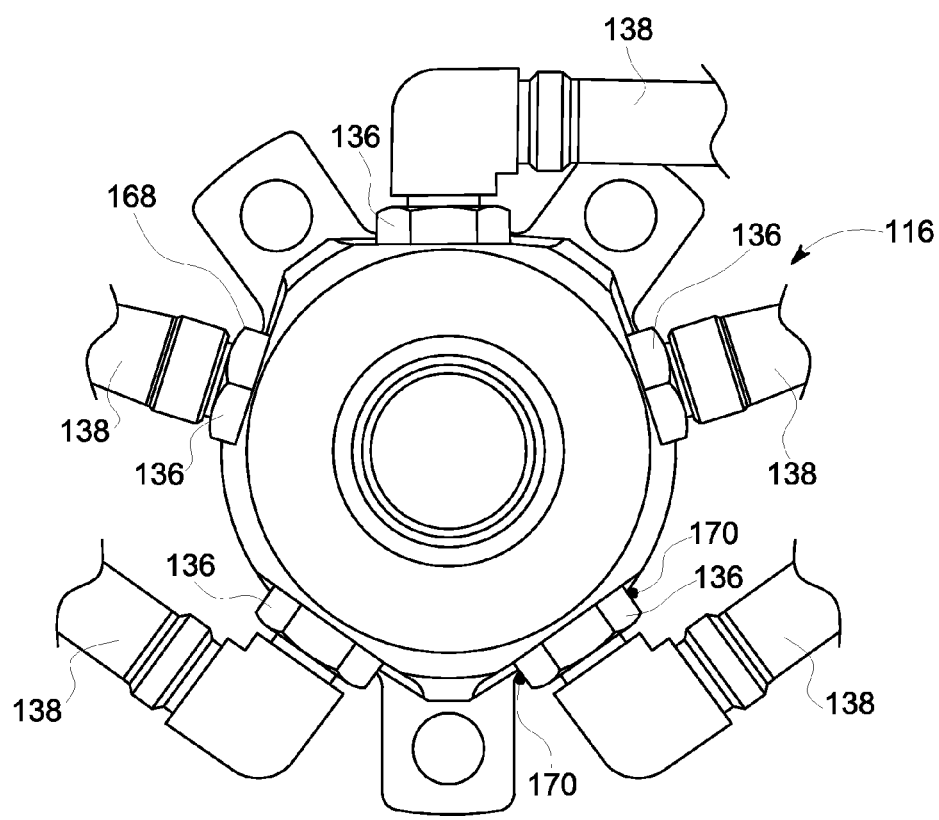
FIG. 3 is a drawing showing an exemplary fuel distribution manifold.

As shown in FIG. 3, a fuel distribution manifold 116 includes five outlets 136 that are each coupled to a respective offspring fuel line 138. It should be appreciated that contemplated configurations have as few as two outlets 136 or many more (e.g., ten or more) as required for the particular application. Each outlet 136 may be straight or may incorporate a bend configured to meet geometric constraints imposed by adjacent hardware and/or assembly, serviceability, reliability, or safety considerations. Each outlet 136 may include standard ISO fittings 168 for ease of installation with secondary spot welds 170 for enhanced security and reliability. For example, fittings 168 may be ISO male thread quick connections with secondary locking features (e.g., simple secondary tack welds or locking wire or cotter pins) to provide safety and reliability while allowing easy assembly and disassembly in field. Each of the outlets 136 is positioned adjacent to the base 140 of the cone. Positioning the outlets 136 adjacent to the base 140 tends to reduce the likelihood of formation of a stagnation zone in the flow-path in the vicinity of the base 140.

Figure 4:
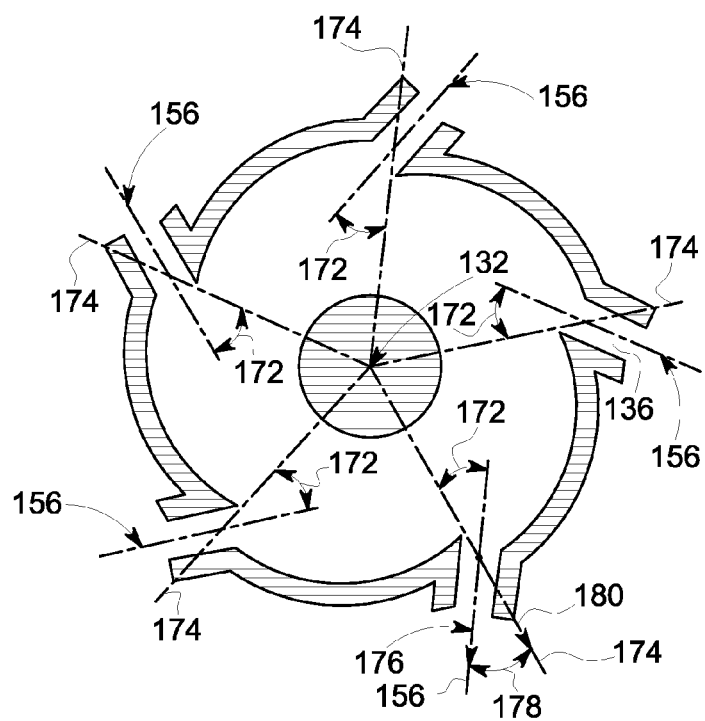
FIG. 4 is a cutaway drawing showing an exemplary fuel distribution manifold.

As show in FIG. 4, in an exemplary embodiment, each outlet 136 defines an outlet axis 156 that is oriented with the direction of flow entering the respective outlet 136. Optionally, each outlet axis 156 is oriented so as to be rotated relatively to the central manifold axis 132. Accordingly, an outlet 136 may be oriented so that its respective outlet axis 156 defined by the outlet 136 is separated from the central manifold axis 132 and defines a rotation angle 172 (e.g., between approximately about 5 degrees and 85 degrees) relative to a radial direction 174 (i.e., is oriented so as to be rotated relative to a radial direction 174 that intersects the central manifold axis 132). Accordingly, a fuel flow velocity vector 176 oriented parallel to an outlet axis 156 may exhibit a tangential component 178 in addition to a radial component 180. In an extreme case, an outlet axis 156 may be oriented in a purely tangential direction such that the outlet axis 156 is oriented transversely to a radius vector 174 intersecting the central manifold axis 132 and such that a fuel flow velocity vector 176 oriented parallel to the outlet axis 156 exhibits a purely tangential component 178 with a radial component 180 with approximately zero magnitude.

As one skilled in art will appreciate, the orientation of each outlet axis 156 may be configured so as to induce a desired swirl (i.e. velocity oriented in a circumferential or tangential direction) within the fuel distribution manifold 116. The orientation of the outlets 136 can be effective to control the magnitude of a tangential component 178 associated with the direction of flow of fuel passing through the fuel distribution manifold 116. Coupled with a velocity component along the direction of flow 158 that relates to movement of fuel from the inlet 134 to toward the outlets 136, the tangential component results in localized fuel streamlines that spiral about the center-body 142 and more effectively sweep the inner surface 152 of the outer shell 130 and the outer surface 150 of the center-body 142, thereby reducing the likelihood of the formation of a fuel stagnation zone or a fuel re-circulation zone.

Accordingly, the invention provides a fuel distribution manifold that can deliver fuel to a set of desired locations in accordance with a desired set of attributes while reducing, or better tolerating, coking. In an exemplary embodiment, a fuel distribution manifold is configured so as to deliver fuel to a plurality of offspring fuel lines with a substantially uniform set of attributes. An exemplary fuel distribution manifold substantially reduces fuel stagnation and recirculation zones so as to provide more thorough flushing of the fuel distribution manifold by the flow of fuel. In this way, an exemplary embodiment provides for thermal insulation from an end cover of a combustor or other heat generating hardware on which the fuel distribution manifold may be positioned.

By reducing fuel stagnation and recirculation zones, an exemplary embodiment of the invention improves the extent to which fuel flushes the fuel distribution manifold, thereby reducing effective fuel residence times within the fuel distribution manifold, particularly at specific high heat regions within the fuel distribution manifold in particular. This reduces formation of coke (i.e., coking) within the fuel distribution manifold.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel distribution manifold comprising:
an outer shell having an inner surface and being configured for containing a flow of pressurized fuel, the outer shell defining:
an inlet for receiving a supply of fuel from a parent supply line, the inlet being formed to define a locally narrow-most portion;
a base opposite the inlet;
a plurality of outlets for delivering fuel to offspring fuel lines, each outlet defining a respective outlet axis; and
a central manifold axis that intersects the inlet;
the fuel distribution manifold further comprising:
a center-body having a frusto-conical outer surface leading to a convex end and being positioned within the outer shell; and
an inlet screen retained in and extending across a plane of the inlet,
the center body extending axially such that a distal-most portion of the convex end of the center body is aligned with the locally narrow-most portion of the inlet to support the inlet screen, and an outer surface of the center-body and the inner surface of the outer shell defining a flow-path through which fluid flows from the inlet to the plurality of outlets.

2. A fuel distribution manifold as in claim 1, wherein at least one of the plurality of outlets is positioned adjacent to the base and oriented so that its respective outlet axis is rotated relatively to a radial direction that intersects the central manifold axis.

3. A fuel distribution manifold as in claim 1, wherein the center-body is positioned within the outer shell so as to divide the fluid entering the fuel distribution manifold through the inlet.

4. A fuel distribution manifold as in claim 1, wherein the center-body is aligned with the central manifold axis.

5. A fuel distribution manifold as in claim 1, wherein the center-body is fixed to the base and extends axially from the base.

6. A fuel distribution manifold as in claim 1, wherein the outer surface of the center-body is symmetric about the central manifold axis.

7. A fuel distribution manifold as in claim 1, wherein the outer surface of the center-body and the inner surface of the outer shell define a flow-path that decreases in cross-sectional area with increasing distance along the flow-path.

8. A fuel distribution manifold as in claim 1, wherein the outer surface of the center-body is configured to cause fluid to accelerate as it flows through the fuel distribution manifold.

9. A fuel distribution manifold as in claim 1, wherein the flow-path is characterized by a cross-sectional area that decreases with distance along the central manifold axis.

10. A fuel distribution manifold as in claim 1, wherein the flow-path is characterized by a cross-sectional area that decreases at least linearly with distance along the central manifold axis.

11. A fuel distribution manifold as in claim 1, wherein an area of the flow-path at the inlet is at least about four times as great as an area of the flow-path at the plurality of outlets.

12. A fuel distribution manifold as in claim 1, wherein an area of the flow-path at the inlet is less than about eight times as great as an area of the flow-path at the plurality of outlets.

13. A fuel distribution manifold as in claim 1, wherein at least one of the plurality of outlets is positioned adjacent to the base and oriented so that its respective outlet axis is rotated relatively to a radial direction that intersects the central manifold axis.

14. A fuel distribution manifold as in claim 1, wherein the outer surface of the center-body is coated with a material that repels fuel.

15. A fuel distribution manifold as in claim 1, wherein the inner surface of the outer shell is coated with a material that repels fuel.

16. A fuel distribution manifold comprising:
an outer shell having an inner surface that defines a flow-path through which fluid flows from an inlet to a plurality of outlets;
the outer shell also defining:
an inlet for receiving a supply of fuel from a parent supply line, the inlet being formed to define a locally narrow-most portion;
a base opposite the inlet;
a plurality of outlets for delivering fuel to offspring fuel lines, each outlet defining a respective outlet axis; and
a central manifold axis that intersects the inlet;
the outer shell being configured for containing a flow of pressurized fuel;
an inlet screen retained in and extending across a plane of the inlet; and
a center-body having a frusto-conical outer surface, which is entirely smooth, leading to a convex end and being positioned within the outer shell, the center body extending axially such that a distal-most portion of the convex end of the center body is aligned with the locally narrow-most portion of the inlet to support the inlet screen, and
at least one of the plurality of outlets being positioned adjacent to the base and oriented so that its respective outlet axis is rotated relatively to a radial direction that intersects the central manifold axis.

17. A fuel distribution manifold as in claim 16, wherein the at least one of the plurality of outlets is oriented so that its respective outlet axis is rotated between about 5 degrees and about 85 degrees relatively to a radial direction that intersects the central manifold axis.

18. A fuel distribution manifold as in claim 16, wherein the outlets have openings and extend longitudinally along and in parallel with a plane of the base,
a straight portion of the frusto-conical outer surface of the center-body traversing the openings.

19. An engine, comprising:
a combustor configured about a combustor axis;
a fuel distribution manifold disposed on the combustor axis between a fuel source and the combustor, the manifold comprising a body defining an inlet receptive of fuel from the fuel source and a plurality of outlets through which the fuel is output, the body comprising:
a base having a plane;
an inlet screen retained in and extending across a plane of the inlet; and
a center-body extending axially toward the inlet from the base to support the inlet screen at a locally narrow-most portion of the inlet,
the plurality of outlets having openings traversed by a straight portion of an outer surface of the center-body and extending radially outwardly from the center-body along and in parallel with the plane of the base; and offspring fuel lines receptive of the fuel from the outlets, the fuel lines extending radially outwardly from the outlets relative to the combustor axis, axially along the combustor axis and radially inwardly toward the combustor relative to the combustor axis.

* * * * *